United States Patent
Hodgkinson

(10) Patent No.: US 10,480,636 B2
(45) Date of Patent: Nov. 19, 2019

(54) ANTI-CLOG LUBRICANT DISTRIBUTION ASSEMBLY

(71) Applicant: Sikorsky Aircraft Corporation, Stratford, CT (US)

(72) Inventor: Eric James Hodgkinson, New Hartford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 295 days.

(21) Appl. No.: 15/519,743

(22) PCT Filed: Oct. 13, 2015

(86) PCT No.: PCT/US2015/055212
§ 371 (c)(1),
(2) Date: Apr. 17, 2017

(87) PCT Pub. No.: WO2016/061027
PCT Pub. Date: Apr. 21, 2016

(65) Prior Publication Data
US 2017/0254406 A1    Sep. 7, 2017

Related U.S. Application Data

(60) Provisional application No. 62/065,123, filed on Oct. 17, 2014.

(51) Int. Cl.
*F16H 57/04* (2010.01)
*F16N 29/02* (2006.01)
*B64C 27/12* (2006.01)

(52) U.S. Cl.
CPC .......... *F16H 57/042* (2013.01); *B64C 27/12* (2013.01); *F16H 57/0404* (2013.01); *F16H 57/045* (2013.01); *F16H 57/0434* (2013.01); *F16H 57/0436* (2013.01); *F16N 29/02* (2013.01)

(58) Field of Classification Search
CPC .............. F16H 57/042; F16H 57/0404; F16H 57/0434; F16H 57/0436; F16H 57/045; B64C 27/12; F16N 29/02
See application file for complete search history.

(56) References Cited

U.S. PATENT DOCUMENTS

| | | |
|---|---|---|
| 1,742,758 A | 1/1930 | Curphey |
| 2,548,160 A | 4/1951 | Hunter |
| 3,817,380 A | 6/1974 | Brown |
| 4,244,279 A | 1/1981 | Stewart et al. |

(Continued)

OTHER PUBLICATIONS

International Search Report and Written Opinion of the International Search Authority dated Jan. 7, 2016 in related PCT Application No. PCT/US2015/055212, 9 pages.

*Primary Examiner* — Michael A Riegelman
(74) *Attorney, Agent, or Firm* — Cantor Colburn LLP

(57) ABSTRACT

A fluid distribution assembly for distributing a fluid includes a first inlet housing; an outlet housing fluidly coupled to the first inlet housing; and a second inlet housing fluidly coupled to the outlet housing; the second inlet housing having a first end and a second end, the second end coupled to the outlet housing at a stagnation dam, the stagnation dam controlling direction of fluid flow through the second inlet housing in response to velocity of fluid flow in the outlet housing.

13 Claims, 6 Drawing Sheets

(56) References Cited

U.S. PATENT DOCUMENTS

| | | | | |
|---|---|---|---|---|
| 4,429,587 | A | * | 2/1984 | Finn, III .............. F16H 57/0447 57/447 |
| 6,116,272 | A | * | 9/2000 | Kratzet .................... F01M 1/16 137/516.11 |
| 8,226,822 | B2 | | 7/2012 | Paradise |
| 8,708,105 | B2 | | 4/2014 | Sowul et al. |
| 2008/0116009 | A1 | * | 5/2008 | Sheridan ................. F01D 25/18 184/6.4 |
| 2010/0025159 | A1 | * | 2/2010 | Gmirya ................... B64C 27/12 184/6.4 |
| 2013/0008745 | A1 | * | 1/2013 | Barrett ...................... F02C 7/06 184/6.11 |
| 2013/0323015 | A1 | * | 12/2013 | DeWald ............... B60K 17/344 415/1 |
| 2015/0129361 | A1 | * | 5/2015 | Hodgkinson ...... G01N 33/2888 184/6.4 |
| 2017/0254406 | A1 | * | 9/2017 | Hodgkinson ............ F16N 29/02 |
| 2018/0031107 | A1 | * | 2/2018 | Howard ............. G01N 33/2888 |

* cited by examiner

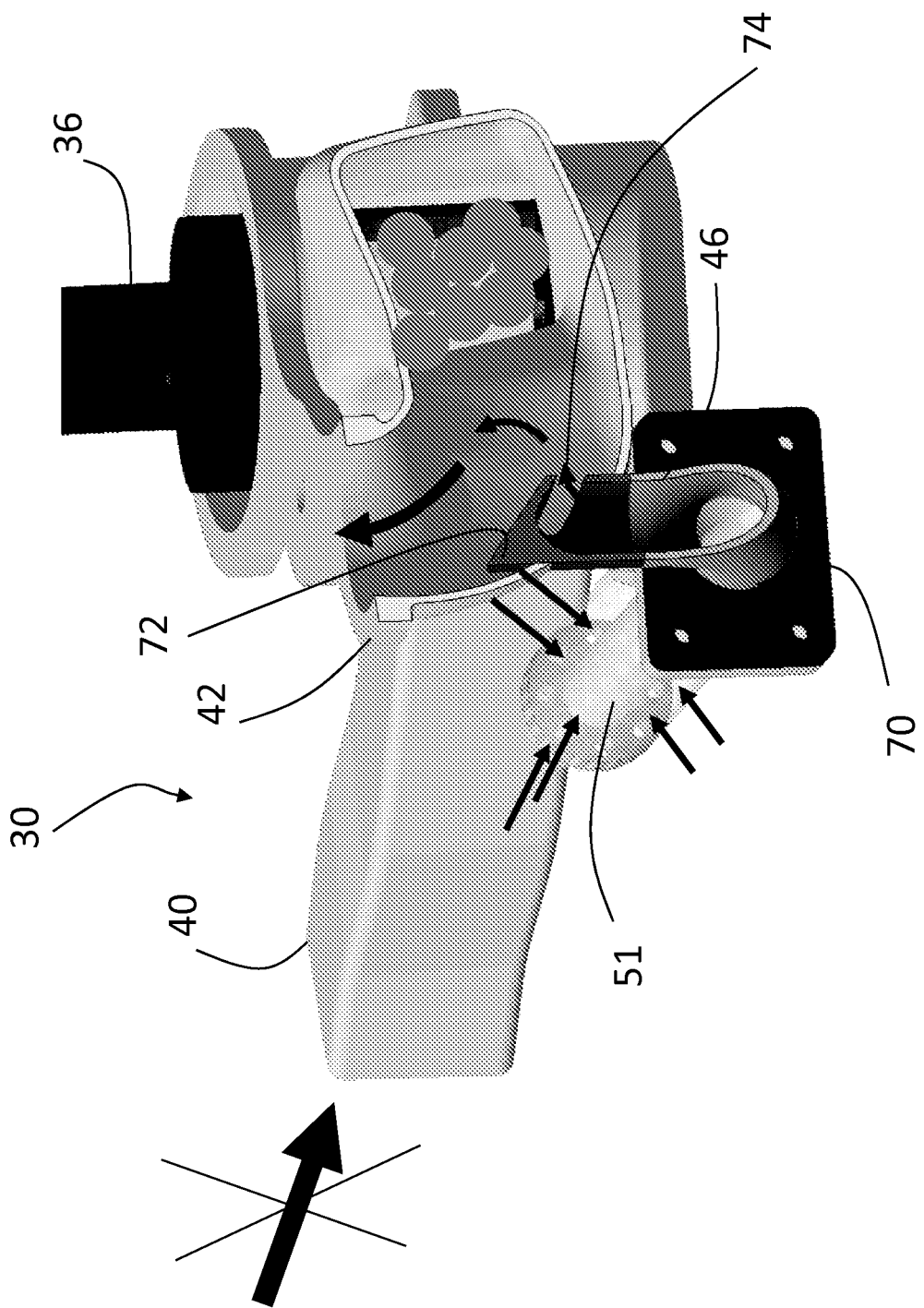

ANTI-CLOG LUBRICANT DISTRIBUTION ASSEMBLY

CROSS-REFERENCE TO RELATED APPLICATIONS

The present application is a 371 National Stage of International Patent Application No. PCT/US2015/055212, filed on Oct. 13, 2015, which claims priority to U.S. Provisional Application No. 62/065,123, filed on Oct. 17, 2014, the contents of which are incorporated herein by reference in their entirety.

BACKGROUND

The subject matter disclosed herein relates generally to lubricant distribution, and in particular, to a lubricant distribution assembly that provides multiple paths for lubricant in a rotary wing aircraft.

Existing rotary wing aircraft employ a lubricant distribution assembly to convey lubricant to one or more gearboxes. An existing lubricant distribution assembly has a single inlet housing with a chip detector sensor and chip detector screen. The chip detector sensor and chip detector screen capture and detect metallic contaminants in the lubricant that is traveling to the lubricant pumps. A drawback to the existing lubricant distribution assembly is that excessive debris may clog the chip detector screen or inlet housing and prevent lubricant from passing through the inlet housing to the lubricant pumps.

SUMMARY

In one exemplary embodiment, a fluid distribution assembly for distributing a fluid comprises a first inlet housing; an outlet housing fluidly coupled to the first inlet housing; and a second inlet housing fluidly coupled to the outlet housing; the second inlet housing having a first end and a second end, the second end coupled to the outlet housing at a stagnation dam, the stagnation dam controlling direction of fluid flow through the second inlet housing in response to velocity of fluid flow in the outlet housing.

In addition to one or more of the features described above, or as an alternative, further embodiments could include an inlet screen positioned at an inlet of the second inlet housing.

In addition to one or more of the features described above, or as an alternative, further embodiments could include a filter between the first inlet housing and the outlet housing.

In addition to one or more of the features described above, or as an alternative, further embodiments could include when the filter is unblocked, the stagnation dam controls the fluid flow from the second end to the first end of the second inlet housing, and when the filter is blocked, the stagnation dam controls the fluid flow from the first end to the second end of the second inlet housing.

In addition to one or more of the features described above, or as an alternative, further embodiments could include when the first inlet housing is unblocked, fluid flows from the second end of the second inlet housing to the first end of the second inlet housing.

In addition to one or more of the features described above, or as an alternative, further embodiments could include when the first inlet housing is blocked, fluid flows from the first end of the second inlet housing to the second end of the second inlet housing.

In addition to one or more of the features described above, or as an alternative, further embodiments could include the stagnation dam controls direction of fluid flow through the second inlet housing in response to static pressure and dynamic pressure.

In another exemplary embodiment, a rotary wing aircraft comprises: a rotor; a gearbox coupled to the rotor; an engine coupled to the gearbox; and a lubricant distribution system providing lubricant from a sump to the gearbox, the lubricant distribution system including: a first inlet housing fluidly coupled to the sump; an outlet housing fluidly couple to the first inlet housing; and a second inlet housing fluidly coupled to the outlet housing; the second inlet housing having a first end fluidly connected to the sump and a second end coupled to the outlet housing, the second end including a stagnation dam controlling direction of fluid flow through the second inlet housing in response to velocity of fluid flow in the outlet housing.

In addition to one or more of the features described above, or as an alternative, further embodiments could include an inlet screen positioned at an inlet of the second inlet housing.

In addition to one or more of the features described above, or as an alternative, further embodiments could include a filter between the first inlet housing and the outlet housing, wherein: when the filter is unblocked, the stagnation dam controls the fluid flow from the second end to the first end of the second inlet housing, and when the filter is blocked, the stagnation dam controls the fluid flow from the first end to the second end of the second inlet housing.

In addition to one or more of the features described above, or as an alternative, further embodiments could include when the first inlet housing is unblocked, fluid flows from the second end of the second inlet housing to the first end of the second inlet housing.

In addition to one or more of the features described above, or as an alternative, further embodiments could include when the first inlet housing is blocked, fluid flows from the first end of the second inlet housing to the second end of the second inlet housing.

In addition to one or more of the features described above, or as an alternative, further embodiments could include the stagnation dam controls direction of fluid flow through the second inlet housing in response to static pressure and dynamic pressure.

In addition to one or more of the features described above, or as an alternative, further embodiments could include a pump coupled to the outlet housing, the pump directing lubricant through the first inlet housing and the second inlet housing.

Embodiments provide the technical effect of providing a secondary path for lubricant in the event of blockage of a first path for lubricant, without requiring valves, check valves, or other actuated flow control devices. Embodiments provide the technical effect of self-cleaning an inlet screen located in the second path when the first path is unblocked.

Other aspects, features, and techniques of the invention will become more apparent from the following description taken in conjunction with the drawings.

BRIEF DESCRIPTION OF THE DRAWINGS

Referring now to the drawings wherein like elements are numbered alike in the several FIGURES, in which:

FIG. 6 depicts lubricant flow in the lubricant distribution assembly with the first inlet blocked.

DETAILED DESCRIPTION

Figure 1:
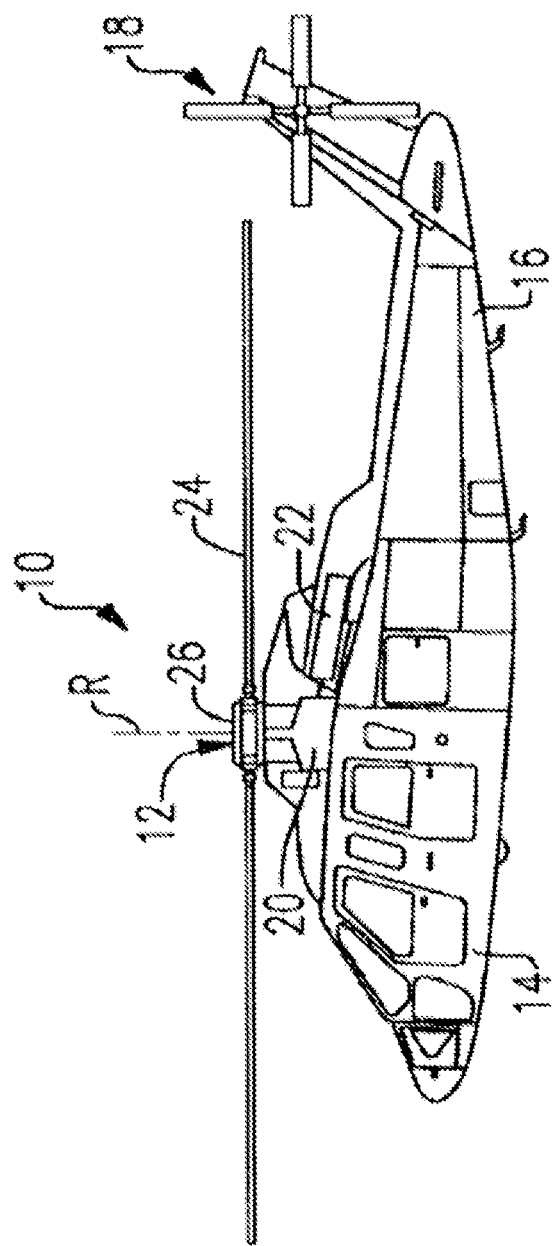
FIG. 1 illustrates a rotary wing aircraft in an exemplary embodiment.

FIG. 1 illustrates a rotary-wing aircraft 10 having a main rotor assembly 12. The aircraft 10 includes an airframe 14 having an extending tail 16 which mounts a tail rotor system 18, such as an anti-torque system, a translational thrust system, a pusher propeller, a rotor propulsion system, and the like. The main rotor assembly 12 is driven about an axis of rotation R through a main gearbox 20 by one or more engines 22. The main rotor assembly 12 includes a multiple of rotor blades 24 mounted to a rotor hub 26. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from embodiments of the invention.

Figure 2:
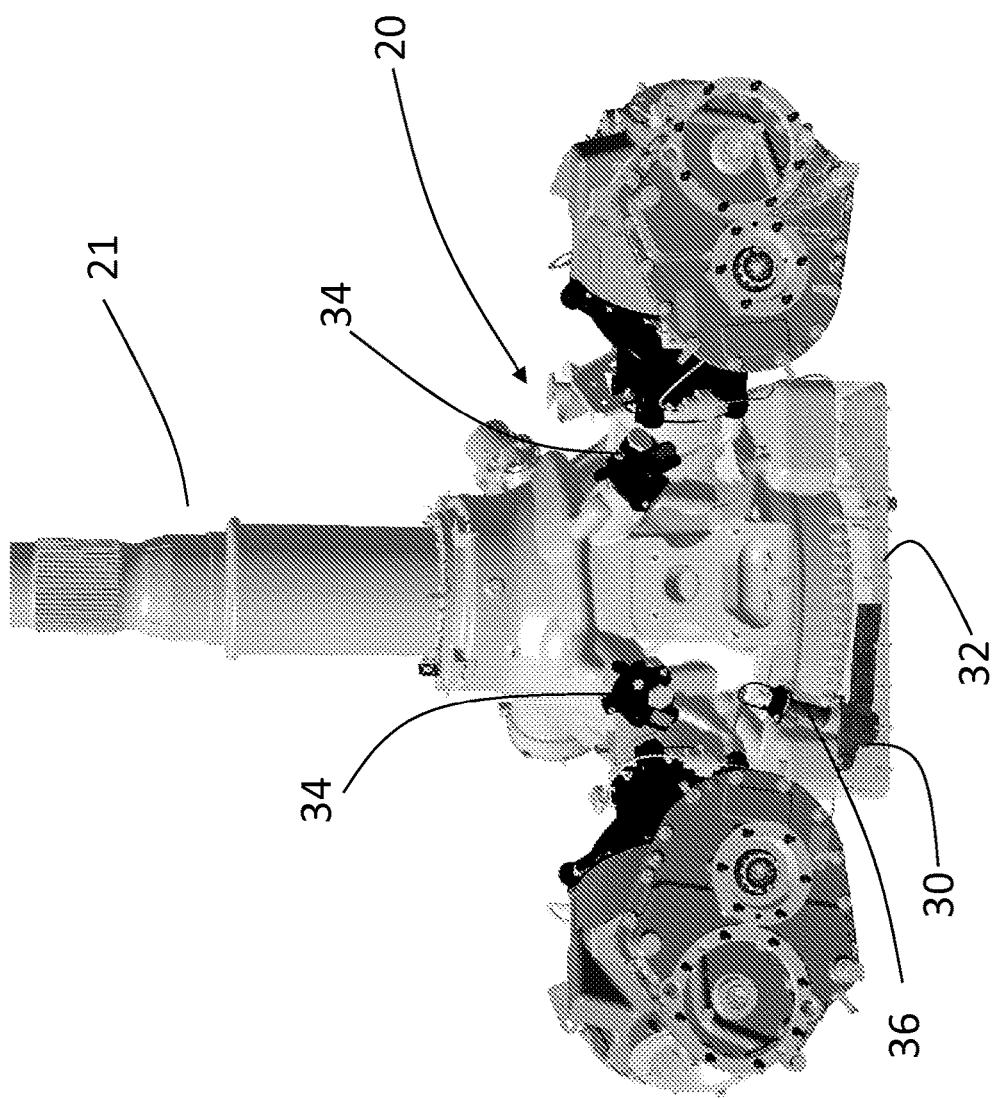
FIG. 2 depicts a gearbox and rotor shaft in an exemplary embodiment.

FIG. 2 depicts a gearbox assembly 20 and main rotor shaft 21 in an exemplary embodiment. A fluid (e.g., lubricant) distribution assembly 30 is positioned in a lubricant sump 32. Lubricant pumps 34 draw lubricant (e.g., oil) from the sump 32, through the lubricant distribution assembly 30 and supply lubricant to gearbox assembly 20. A chip detector assembly 36 may be mounted to the lubricant distribution assembly 30. While described as a lubricant in the context of gearbox assembly 20, it is understood that, in other aspects, the lubricant is only one type of fluid usable with embodiments of the invention. By way of example, the fluid could be fuel where the sump 32 is a gas tank and the fluid distribution assembly 30 distributes fuel to an engine. By way of another example, the fluid could be coolant where the sump 32 is a coolant reservoir and the fluid distribution assembly 30 distributes coolant to cool an engine. Further, while shown with two pumps 34, it is understood that a single pump 34, or other numbers of pumps 34 could be used in other aspects.

Figure 3:
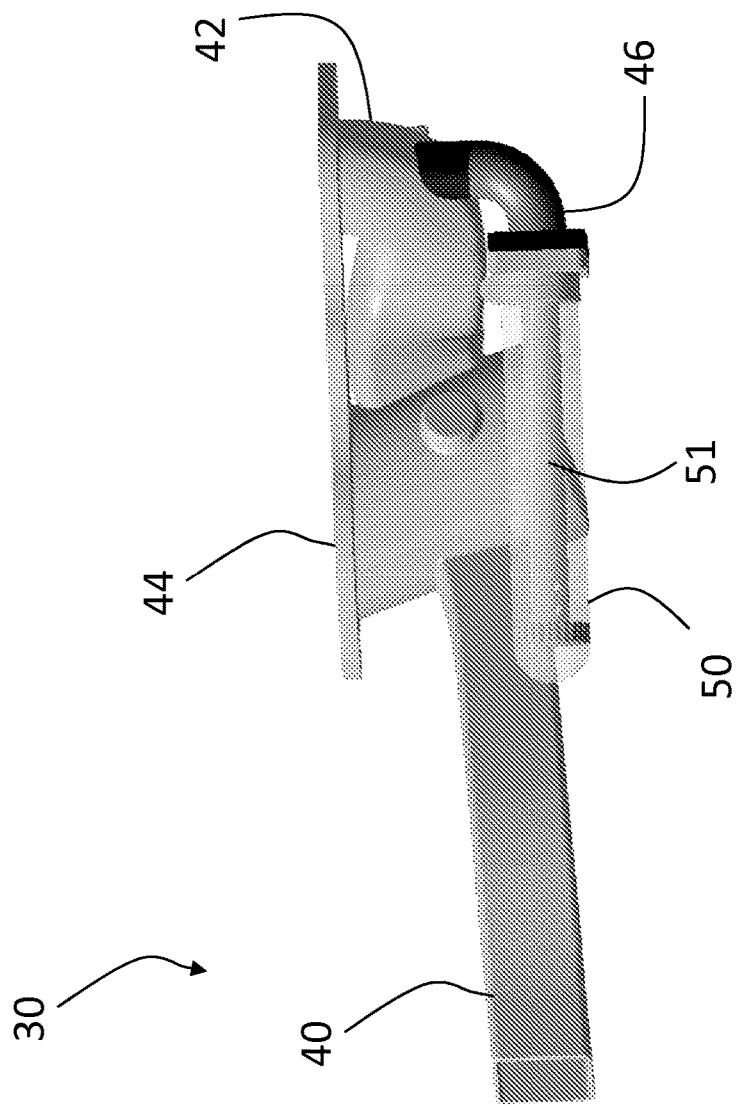
FIG. 3 depicts a lubricant distribution assembly in an exemplary embodiment.

FIG. 3 depicts a lubricant distribution assembly 30 in an exemplary embodiment. Lubricant distribution assembly 30 includes an inlet housing 40. Inlet housing 40 is a hollow member for placement in the sump 32 (See FIG. 2). The inlet housing 40 is in fluid communication with an outlet housing 42. An outlet of outlet housing 42 is in fluid communication with the lubricant pump(s) 34 (See FIG. 2). Interposed between inlet housing 40 and outlet housing 42 is a chip detector cavity 44 in fluid communication with inlet housing 40 and outlet housing 42. Chip detector cavity 44 is a generally cylindrical member, having a hollow interior to receive a portion of chip detector assembly 36 (FIG. 5).

The lubricant distribution assembly 30 also includes a second inlet housing 46 in fluid communication with outlet housing 42. Second inlet housing 46 is fluidly coupled to outlet housing 42 downstream of chip detector cavity 44. A generally cylindrical inlet screen 50 is positioned at an inlet to the second inlet housing 46. Inlet screen 50 filters contaminants from the lubricant, and may be supported by an inlet tube 51 in fluid communication with second inlet housing 46. Inlet tube 51 may include perforations along its length to allow fluid to pass through an exterior wall of inlet tube 51. Inlet screen 50 may be a large surface area screen to prevent clogging of secondary inlet and therefore maintain oil flow to critical bearings and gear meshes. Inlet screen 50 and second inlet housing 46 are also positioned in sump 32.

Figure 4:
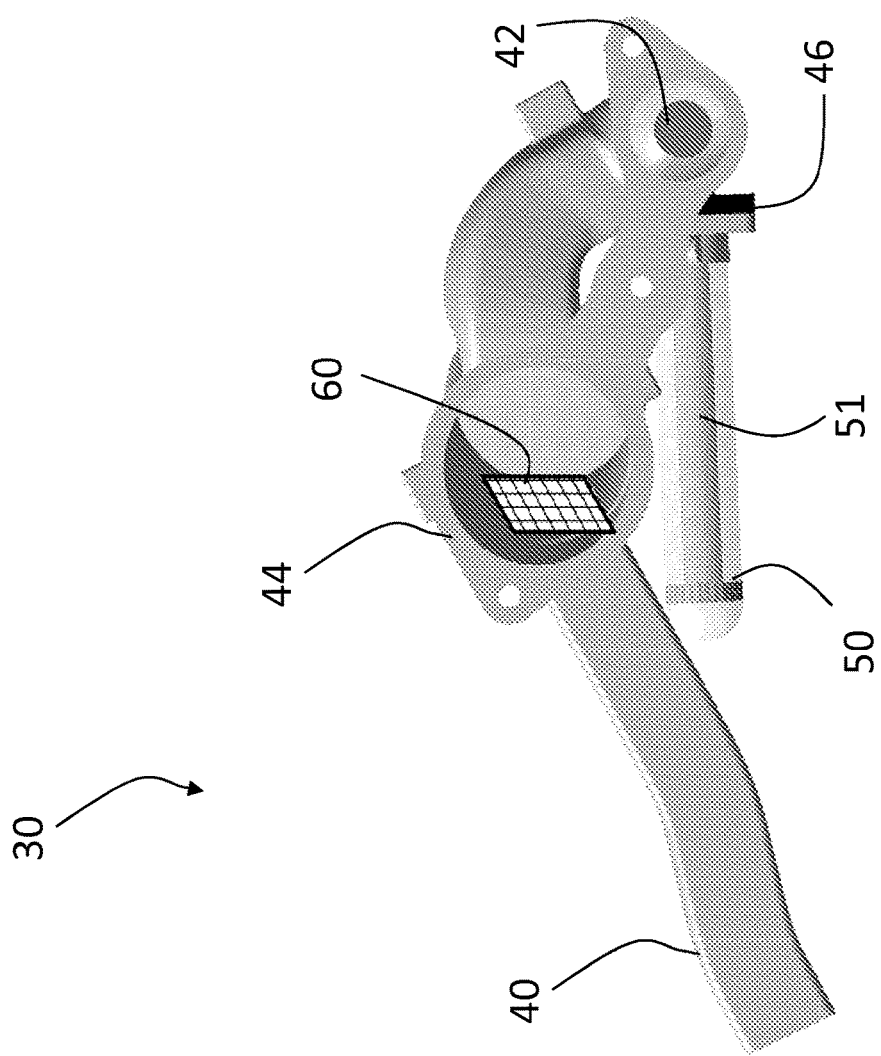
FIG. 4 depicts the lubricant distribution assembly.

FIG. 4 depicts a lubricant distribution assembly 30 in an exemplary embodiment. As shown in FIG. 4, a filter 60 to capture contaminants in lubricant traveling from inlet housing 40 to outlet housing 42. Lubricant traveling from inlet housing 40 to outlet housing 42 passes through filter 60. Filter 60 may be implemented using a metal screen or other filter media. Filter 60 may be part of the chip detector assembly 36.

Figure 5:
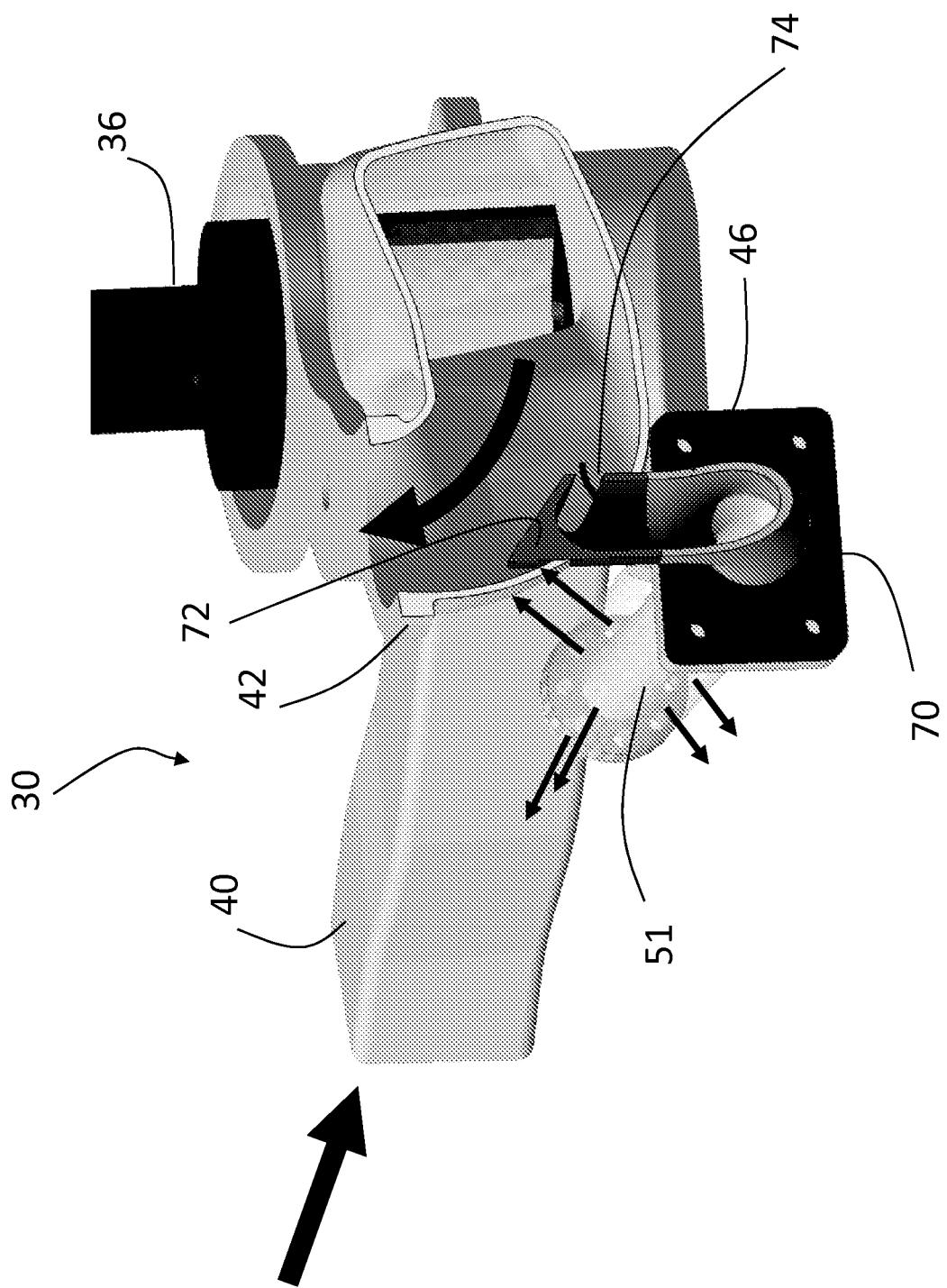
FIG. 5 depicts lubricant flow in the lubricant distribution assembly with a first inlet unblocked.

FIG. 5 depicts lubricant flow in the lubricant distribution assembly 30 with inlet housing 40 unblocked. In this mode, the filter 60 (FIG. 4) is unclogged and allows lubricant to flow. A first end 70 of second inlet housing inlet 46 is coupled to inlet tube 51. A second end 72 of second inlet housing 46 is coupled to outlet housing 42. The second end 72 of second inlet housing 46 includes a stagnation dam 74. The stagnation dam 74 may be positioned to be facing or partially facing upstream of the flow path through outlet housing 42. The stagnation dam 74 controls a direction of lubricant flow through the second inlet housing 46.

The pressure at the stagnation dam 74 is equal to static pressure plus dynamic pressure. Static pressure is caused by lubricant pumps 34, and will decrease as filter 60 becomes clogged. The dynamic pressure is a function of lubricant velocity across stagnation dam 74. As the filter 60 becomes clogged, the velocity of the lubricant in the outlet housing 42 will reduce, thereby reducing the dynamic pressure.

FIG. 5 depicts lubricant flow in the lubricant distribution assembly with inlet housing 40 unblocked. In this mode, filter 60 (FIG. 4) is unclogged and allows lubricant to flow. In this mode, the dynamic pressure at stagnation dam 74 is high (e.g. positive), due to the high velocity of lubricant flowing in the outlet housing 42. In this mode, the static pressure is a slight vacuum (e.g., negative), but not sufficient enough to overcome the dynamic pressure. In other words, the magnitude of the negative static pressure is less than the magnitude of the positive dynamic pressure. This results in a net positive pressure at stagnation dam 74, causing a small amount of lubricant to flow from second end 72 to first end 70, out inlet tube 51 and though inlet screen 50, as indicated by the arrows in FIG. 5. This provides self-cleaning of inlet screen 50.

FIG. 6 depicts the lubricant flow in the lubricant distribution assembly 30 with the inlet housing 40 blocked. This blocked condition may be due to a buildup of debris on filter 60, by way of example. The blocked condition does not require complete blockage or total interruption of lubricant flow in inlet housing 40. Blocked, as used herein, refers to a condition where the flow of lubricant through inlet housing 40 is below a threshold, which may also trigger an indication to an operator of the aircraft.

When the inlet housing 40 is blocked, the static pressure caused by pumps 34 becomes more negative and the dynamic pressure due to lubricant velocity is low (positive), or zero. In other words, the magnitude of the negative static pressure is greater than the magnitude of the positive (or zero) dynamic pressure. This results in a net negative pressure at stagnation dam 74, causing lubricant to flow though inlet screen 50, inlet tube 51, first end 70, second end 72 and out stagnation dam 74, as indicated by the arrows in FIG. 6. Lubricant flow through the second inlet housing 46 may have a restricted flow rate so that a low fluid pressure indication would be detected by an operator and the cause for the clog in inlet housing 40 could be investigated. This may be achieved by controlling the flow rate through inlet screen 50 by selecting a material for screen 50 having a desire flow rate. Flow in second inlet housing 46 may also be controlled by selecting suitable sizes for openings in inlet tube 50. A restricted flow rate through second inlet housing 46 helps prevent debris from getting pulled against inlet screen 50 and reduces the likelihood of clogging inlet screen 50.

Embodiments of the lubricant distribution assembly provide a second path for lubricant to an outlet housing in the event an inlet housing is blocked. Embodiments of the lubricant distribution assembly require no valves, check valves or other actuated fluid flow control devices to control flow of lubricant through the second inlet housing.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. By way of example, while described in terms of use on an aircraft, aspects can be used in automobiles, other types of aircrafts beyond rotorcraft, ships, industrial machinery, pipelines, septic or sewer systems, or any other system where fluid flow needs to be maintained. Additionally, while various embodiment of the invention have been described, it is to be understood that aspects of the invention may include only some of the described embodiments. Accordingly, the invention is not to be seen as limited by the foregoing description, but is only limited by the scope of the appended claims.

What is claimed is:

1. A fluid distribution assembly for distributing a fluid, the assembly comprising:
    a first inlet housing;
    an outlet housing fluidly coupled to the first inlet housing; and
    a second inlet housing fluidly coupled to the outlet housing, the outlet housing being fluidically connected between the first inlet housing and the second inlet housing;
    the second inlet housing having a first end and a second end, the second end coupled to the outlet housing at a stagnation dam, the stagnation dam controlling direction of fluid flow through the second inlet housing in response to a change in velocity of fluid flow in the outlet housing from the first inlet housing.

2. The fluid distribution assembly of claim 1 further comprising:
    an inlet screen positioned at an inlet of the second inlet housing.

3. The fluid distribution assembly of claim 1 further comprising:
    a filter between the first inlet housing and the outlet housing,
    wherein:
    when the filter is unblocked, the stagnation dam controls the fluid flow from the second end to the first end of the second inlet housing, and
    when the filter is blocked, the stagnation dam controls the fluid flow from the first end to the second end of the second inlet housing.

4. The fluid distribution assembly of claim 1 wherein:
    when the first inlet housing is unblocked, fluid flows from the second end of the second inlet housing to the first end of the second inlet housing.

5. The fluid distribution assembly of claim 1 wherein:
    when the first inlet housing is blocked, fluid flows from the first end of the second inlet housing to the second end of the second inlet housing.

6. The fluid distribution assembly of claim 1 wherein:
    the stagnation dam controls direction of fluid flow through the second inlet housing in response to static pressure and dynamic pressure.

7. A rotary wing aircraft comprising:
    a rotor;
    a gearbox coupled to the rotor;
    an engine coupled to the gearbox; and
    a lubricant distribution system providing lubricant from a sump to the gearbox, the lubricant distribution system including:
    a first inlet housing fluidly coupled to the sump;
    an outlet housing fluidly couple to the first inlet housing, the outlet housing being fluidically connected between the first inlet housing and the second inlet housing; and
    a second inlet housing fluidly coupled to the outlet housing;
    the second inlet housing having a first end fluidly connected to the sump and a second end coupled to the outlet housing, the second end including a stagnation dam controlling direction of fluid flow through the second inlet housing in response to a change in velocity of fluid flow in the outlet housing from the first inlet housing.

8. The rotary wing aircraft of claim 7 further comprising:
    an inlet screen positioned at an inlet of the second inlet housing.

9. The rotary wing aircraft of claim 7 further comprising:
    a filter between the first inlet housing and the outlet housing,
    wherein:
    when the filter is unblocked, the stagnation dam controls the fluid flow from the second end to the first end of the second inlet housing, and
    when the filter is blocked, the stagnation dam controls the fluid flow from the first end to the second end of the second inlet housing.

10. The rotary wing aircraft of claim 7, wherein:
    when the first inlet housing is unblocked, fluid flows from the second end of the second inlet housing to the first end of the second inlet housing.

11. The rotary wing aircraft of claim 7, wherein:
    when the first inlet housing is blocked, fluid flows from the first end of the second inlet housing to the second end of the second inlet housing.

12. The rotary wing aircraft of claim 7, wherein:
    the stagnation dam controls direction of fluid flow through the second inlet housing in response to static pressure and dynamic pressure.

13. The rotary wing aircraft of claim 7, further comprising:
    a pump coupled to the outlet housing, the pump directing lubricant through the first inlet housing and the second inlet housing.

* * * * *